(12) United States Patent
Idris et al.

(10) Patent No.: US 10,885,736 B2
(45) Date of Patent: Jan. 5, 2021

(54) CONFIGURABLE FLEXIBLE DISPLAYS FOR DISPLAY DEVICES

(71) Applicant: IGT, Las Vegas, NV (US)

(72) Inventors: Fayez Idris, Dieppe (CA); David Froy, Lakeville-Westmorland (CA)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/018,547

(22) Filed: Jun. 26, 2018

(65) Prior Publication Data
US 2019/0392672 A1    Dec. 26, 2019

(51) Int. Cl.
| | | |
|---|---|---|
| G07F 17/00 | (2006.01) | |
| G07F 19/00 | (2006.01) | |
| G06F 1/16 | (2006.01) | |
| G07F 17/32 | (2006.01) | |
| G06F 3/02 | (2006.01) | |

(52) U.S. Cl.
CPC ........ *G07F 17/3209* (2013.01); *G06F 1/1652* (2013.01); *G06F 3/0202* (2013.01); *G07F 17/3213* (2013.01)

(58) Field of Classification Search
CPC .. G07F 17/32; G07F 17/3209; G07F 17/3211; G07F 17/3213; G07F 17/3216; G07F 17/3223; G07F 17/34; G06F 1/1652
See application file for complete search history.

(56) References Cited

U.S. PATENT DOCUMENTS

| | | | |
|---|---|---|---|
| 8,002,624 B2 | 8/2011 | Paulsen et al. | |
| 2003/0060269 A1* | 3/2003 | Paulsen | G07F 17/3211 463/20 |
| 2004/0266515 A1 | 12/2004 | Gauselmann | |
| 2007/0004513 A1* | 1/2007 | Wells | G07F 17/3202 463/31 |
| 2009/0036208 A1* | 2/2009 | Pennington | G07F 17/3202 463/33 |
| 2009/0082103 A1* | 3/2009 | Lube | G07F 17/3211 463/31 |
| 2009/0131150 A1* | 5/2009 | Iverson | G07F 17/3211 463/20 |
| 2012/0004030 A1* | 1/2012 | Kelly | G07F 17/3211 463/31 |
| 2014/0098075 A1* | 4/2014 | Kwak | G06F 3/0487 345/204 |
| 2014/0357364 A1* | 12/2014 | Chudek | G07F 17/3211 463/31 |
| 2015/0146352 A1* | 5/2015 | Yanagisawa | A47G 1/08 361/679.01 |
| 2015/0187325 A1* | 7/2015 | Yeo | G09F 9/301 345/156 |

(Continued)

*Primary Examiner* — Milap Shah
(74) *Attorney, Agent, or Firm* — Sage Patent Group (57) ABSTRACT

A flexible display assembly for a display device having a processor and a memory coupled to the processor includes a flexible display coupled to the processor for displaying graphical elements to a user in response to instructions from the processor. The flexible display is reversibly deformable between a first display configuration and a second display configuration. The display device further includes a mechanical assembly coupled to the flexible display for reversibly deforming the flexible display between the first display configuration and the second display configuration.

17 Claims, 7 Drawing Sheets

(56) References Cited

U.S. PATENT DOCUMENTS

| | | | |
|---|---|---|---|
| 2016/0070304 A1* | 3/2016 | Shin | G06F 1/1656 |
| | | | 361/679.26 |
| 2016/0135284 A1* | 5/2016 | Choi | G09F 9/301 |
| | | | 361/749 |
| 2016/0154435 A1* | 6/2016 | Yanagisawa | A61B 3/005 |
| | | | 348/47 |
| 2018/0260001 A1* | 9/2018 | Klug | H04N 13/395 |
| 2018/0276942 A1* | 9/2018 | Whelan | G07F 17/3213 |

* cited by examiner

CONFIGURABLE FLEXIBLE DISPLAYS FOR DISPLAY DEVICES

FIELD

Embodiments described herein relate to displays for display devices, and in particular to configurable flexible displays for display devices.

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three dimensional display screens.

SUMMARY

Embodiments described herein relate to displays for display devices, and in particular to configurable flexible displays for display devices. According to some embodiments, a flexible display assembly is provided for a display device, such as an electronic gaming machine (EGM). The flexible display assembly includes a flexible display for displaying graphical elements to a user. The flexible display is reversibly deformable between a first shape in a first display configuration and a second shape in a second display configuration. In some embodiments, the first display configuration may be part of a slot game in which the first shape is at least partially cylindrical to simulate a row of cylindrical slot reels, and the second configuration may be part of a bonus game in which the second shape is flat or curved to display bonus game graphics. The flexible display assembly also includes a mechanical assembly coupled to the flexible display for reversibly deforming the flexible display from the first shape to the second shape, and vice versa. For example, the flexible display may simulate a row of cylindrical slot reels in the first configuration as part of a primary slot game, and, in response to a bonus game trigger event in the primary slot game, the mechanical assembly reversibly deforms the flexible display from the first shape to the second shape for providing the bonus game triggered by the trigger event. At the conclusion of the bonus game, the mechanical assembly reversibly deforms the flexible display from the second shape back to the first shape, at which point the primary slot game resumes.

One benefit of these and other arrangements is that the shape of the display can physically change in response to in-game events at the EGM. Conventional flexible displays historically had a very limited number of deformation cycles before the performance and structural integrity of the flexible display would degrade and break down. This in turn limited the versatility of those displays to applications in which the display would be deformed into a single shape, such as a static curved display, and secured in place to avoid further deformation. Newer flexible displays, however, may have thousands of deformation cycles, enabling the displays to be reversibly deformed into different shapes over and over without damaging the flexible display.

According to some embodiments, a display device is disclosed. The display device includes a processor and a memory coupled to the processor. The display device further includes a flexible display coupled to the processor for displaying graphical elements to a user in response to instructions from the processor. The flexible display is reversibly deformable between a first display configuration and a second display configuration. The display device further includes a mechanical assembly coupled to the flexible display for reversibly deforming the flexible display between the first display configuration and the second display configuration.

According to further embodiments, a method of operating a display device is disclosed. The method includes displaying a plurality of first graphical elements to a user on a flexible display of the display device, the flexible display being in a first display configuration. The method further includes operating a mechanical assembly of the display device coupled to the flexible display to reversibly deform the flexible display from the first display configuration to a second display configuration.

According to further embodiments, a flexible display assembly for a display device is disclosed. The flexible display assembly includes a flexible display for displaying graphical elements to a user. The flexible display is reversibly deformable between a first display configuration and a second display configuration. The flexible display assembly further includes a mechanical assembly coupled to the flexible display for reversibly deforming the flexible display between the first display configuration and the second display configuration.

DETAILED DESCRIPTION

Embodiments described herein relate to displays for display devices, and in particular to configurable flexible displays for display devices. According to some embodiments, a flexible display assembly is provided for a display device, such as an electronic gaming machine (EGM). The flexible display assembly includes a flexible display for displaying graphical elements to a user. The flexible display is reversibly deformable between a first shape in a first display configuration and a second shape in a second display configuration. In some embodiments, the first display configuration may be part of a slot game in which the first shape is at least partially cylindrical to simulate a row of cylindrical slot reels, and the second configuration may be part of a bonus game in which the second shape is flat or curved to display bonus game graphics. The flexible display assembly also includes a mechanical assembly coupled to the flexible display for reversibly deforming the flexible display from the first shape to the second shape, and vice versa. For example, the flexible display may simulate a row of cylindrical slot reels in the first configuration as part of a primary slot game, and, in response to a bonus game trigger event in the primary slot game, the mechanical assembly reversibly deforms the flexible display from the first shape to the second shape for providing the bonus game triggered by the trigger event. At the conclusion of the bonus game, the mechanical assembly reversibly deforms the flexible display from the second shape back to the first shape, at which point the primary slot game resumes.

One benefit of these and other arrangements is that the shape of the display can physically change in response to in-game events at the EGM. Conventional flexible displays historically had a very limited number of deformation cycles before the performance and structural integrity of the flexible display would degrade and break down. This in turn limited the versatility of those displays to applications in which the display would be deformed into a single shape, such as a static curved display, and secured in place to avoid further deformation. Newer flexible displays, however, may have thousands of deformation cycles, enabling the displays to be reversibly deformed into different shapes over and over without damaging the flexible display.

Figure 1A:
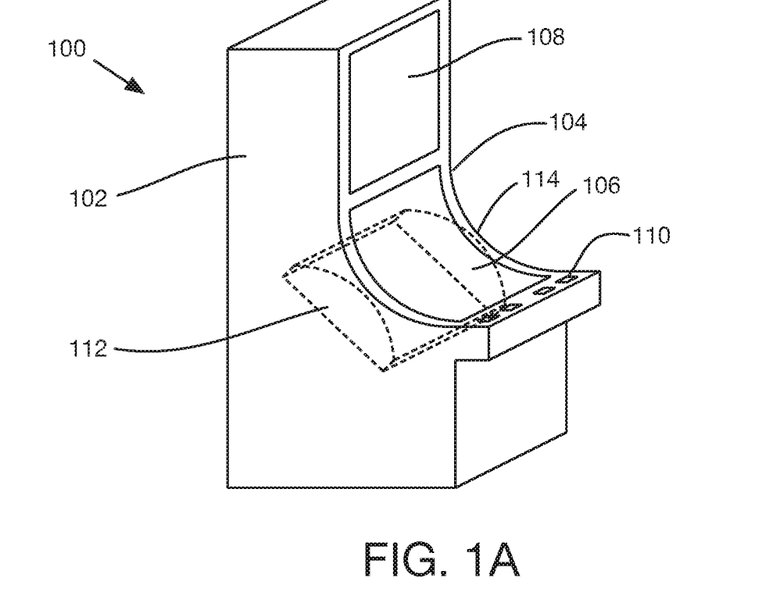
FIGS. 1A and 1B illustrate an electronic gaming machine (EGM) having a configurable flexible display that is reversibly deformable between a plurality of shapes, according to some embodiments.
Figure 1B:
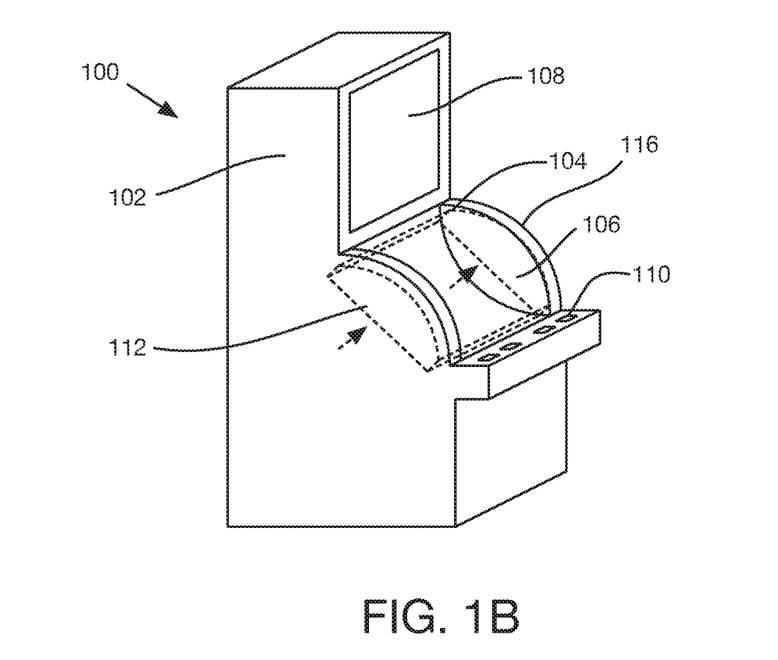

In this regard, FIGS. 1A and 1B illustrate an electronic gaming machine (EGM) having a configurable flexible display that is reversibly deformable between a plurality of shapes, according to some embodiments. In one embodiment, an EGM 100 has a housing 102 similar to a conventional EGM. As discussed in greater detail with respect to FIG. 8 below, the EGM 100 has a number of internal components enabling play of one or more wagering games at the EGM 100. In this embodiment, the EGM 100 has a flexible display 104, including a curved main screen section 106, a secondary screen section 108 above the curved main screen section 106, and an input screen section 110 below the curved main screen section 106. In this embodiment, the input screen section 110 is part of the flexible display, but it should be understood that additional physical input devices, such as physical buttons may be used in addition to or instead of the input screen section 110. In these and other embodiments, the flexible display may be a flexible organic light-emitting diode (OLED) display, such as a flexible polymer-OLED (pLED) display, for example. In other embodiments, the flexible display may be an e-paper display. In these and other embodiments, the flexible display may include touch-sensitive element which may detect a user touching a particular location or region of the flexible display, and may also include touch-reactive elements, which may provide haptic feedback, such as piezo actuators or ultrasonic emitters for producing vibration, audio feedback, such as ultrasonic emitters using the flexible display as a speaker driver, or other types of feedback, based on the user touching a particular location or region of the flexible display.

The EGM 100 includes a curved internal mechanical assembly 112 for reversibly deforming the curved main screen section 106 between a first concave shape 114 with respect to a user of the EGM 100, as shown by FIG. 1A, and a second convex shape 116 with respect to the user of the EGM 100, shown by FIG. 1B. In this example, the internal mechanical assembly includes a convex support structure 118 that is extended forward to reversibly deform the curved main screen section 106 from the first concave shape 114 in FIG. 1A to the second convex shape 116 in FIG. 1B. The convex support structure 118 is retracted back into the housing 102 to reversibly deform the curved main screen section from the second convex shape 116 in FIG. 1B back to the first concave shape 114 in FIG. 1A. It should be understood, however, that the embodiments disclosed herein as not so limited, and that any number of different shapes and configurations are contemplated, and that any number of different mechanical assemblies having different components and functions are contemplated for enabling the reversible deformation of the flexible display between different shapes and configurations, as desired.

In some embodiments, the flexible display 104 may be configured to display graphical elements as part of a game having a plurality of game rules being played by the user of the EGM 100. In response to determining, based on one or more of the game rules, that a game event has occurred, the mechanical assembly 112 may operate to reversibly deform the flexible display 104 in response to determining that the game event has occurred. After reversibly deforming the flexible display 104, the flexible display may display different graphical elements, as part of a bonus game for example.

Figure 2:
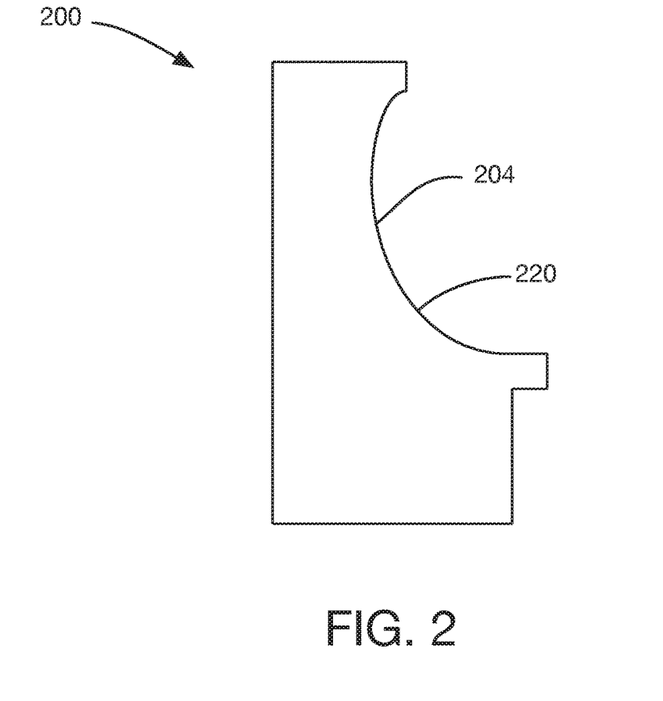
FIG. 2 illustrates an EGM having a configurable flexible display having a fully concave configuration, according to some embodiments.
Figure 3:
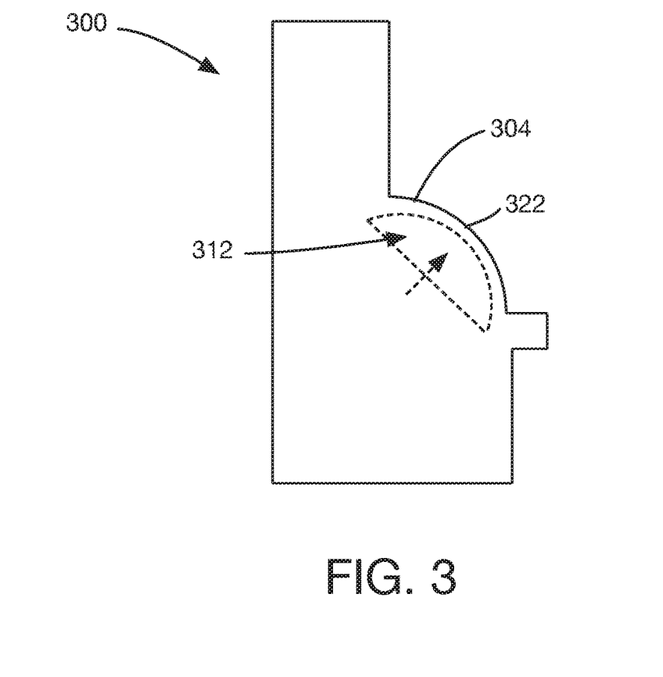
FIG. 3 illustrates an EGM having a configurable flexible display having a partially convex configuration, according to some embodiments.

In this regard, FIGS. 2-5 illustrate side views of a plurality of different EGMs 200-500 having different flexible display configurations and functionalities. For example, FIG. 2 illustrates an EGM 200 having a flexible display 204 in a fully concave configuration 220 that can be reversibly deformed to a different configuration as desired. FIG. 3 illustrates an EGM 300 having a flexible display 304 in a partially convex configuration 322 that can also be reversibly deformed to a different configuration as desired.

Figure 4:
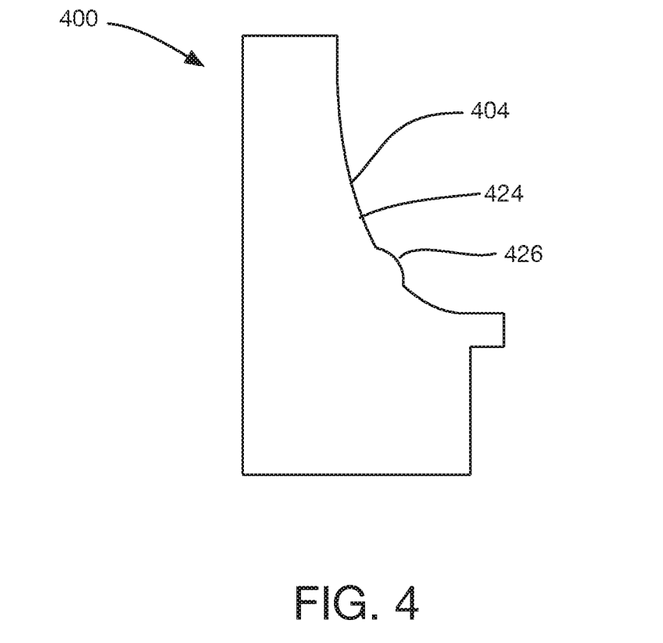
FIG. 4 illustrates an EGM having a configurable flexible display having a concave configuration with a convex button portion, according to some embodiments.
Figure 5:
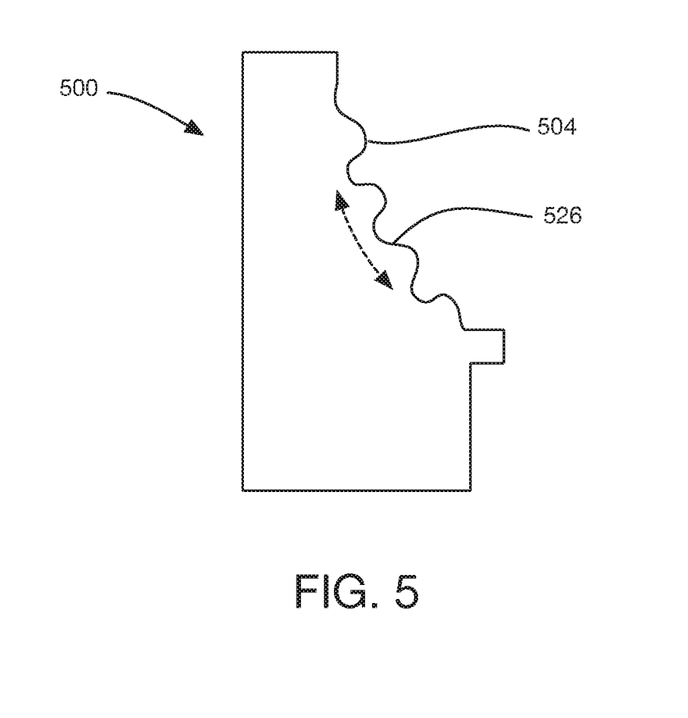
FIG. 5 illustrates an EGM having a configurable flexible display having a continuously deformable wave configuration, according to some embodiments.

It should be understood that parts of the flexible display may be reversibly deformed in response to changes or game events within a primary or bonus game. For example, FIG. 4 illustrates an EGM 400 having a flexible display 404 having a generally concave configuration 424 and one or more convex button portions 426 concave configuration 420 that can be reversibly deformed to a different configuration as desired. For example, in response to a game event, a virtual button may appear on the flexible display 404 for initiating a bonus game. In response to the button being displayed, the portion of the flexible display 404 corresponding to the virtual button may be reversibly deformed into a convex shape, i.e., into the convex button portion 426 to simulate a physical button to be pressed by the player. Providing the convex button portion 426 has the additional advantage of providing tactile feedback to the player, which enhances the gaming experience of the player and may also enabling players with visual impairment to interact with and play at the EGM 400.

In the above embodiments, the reversible deformation is a binary effect, with portions of the flexible display converting between static shapes in different configurations, but is should be understood that the reversible deformation in some embodiments may be a continuous effect over a period of time. In this regard, the EGM 500 of FIG. 5 has a flexible display 504 having a movable wave pattern to simulate waves moving up or down the flexible display 504, which may be achieved by rollers or other mechanisms moving in patterns with respect to the flexible display 504. It should be understood that the movable wave pattern of FIG. 5 or any other pattern or configuration described herein may be part of a primary display configuration or a secondary display configuration for a main display, a second display, or any other display or type of display, as desired. Other examples of continuous reversible deformations may include a portion of the flexible display pulsing inwardly and outwardly periodically to simulate a heartbeat, for example. Here again, it should be understood that the embodiments disclosed herein as not so limited, and that any number of different shapes and configurations are contemplated, and that any number of different mechanical assemblies having different components and functions are contemplated for enabling the reversible deformation of the flexible display between different shapes and configurations, as desired.

For example, in a reel game when a winning line combination appears on screen, the flexible display can be deformed to highlight the line win. For example, in a line game with five reels and three elements high an array of fifteen actuators with shapes that match the dimensions of a reel symbol. Depending on the game result, different actuators would move in and out to deform the portions of the flexible screen corresponding to the winning elements.

In other embodiments, particular portions of the flexible display may be reversibly deformed to be convex (i.e., not concave), concave (i.e., not convex), flat (i.e. not convex or concave), or a combination thereof, with one or more portions having a particular bend radius about a bend axis. The bend axis may be straight or curved, may be disposed at a particular angle with respect to the user of the EGM, and may be horizontal, vertical, or at a combination thereof. In some examples, a portion of the flexible display forms a partially cylindrical arc having a particular central angle (e.g., 5, 10, 15, 30, 45, 60, 90, 120, 150, 180, 270 degrees or more) about the bend axis.

Figure 6A:
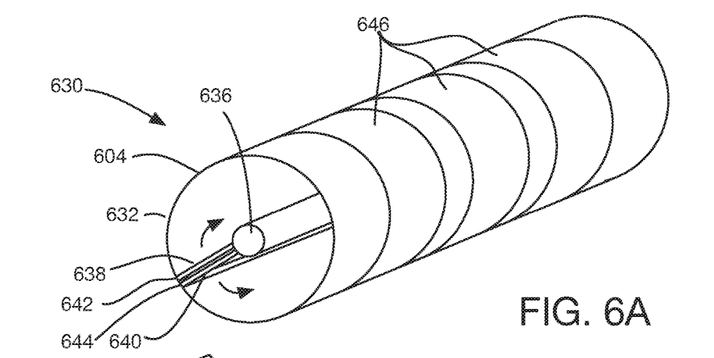
FIGS. 6A-6C illustrate a flexible display mechanism for reversibly deforming a configurable flexible display between a first cylindrical shape and a second flat shape, according to some embodiments.
Figures 6B, 6C:
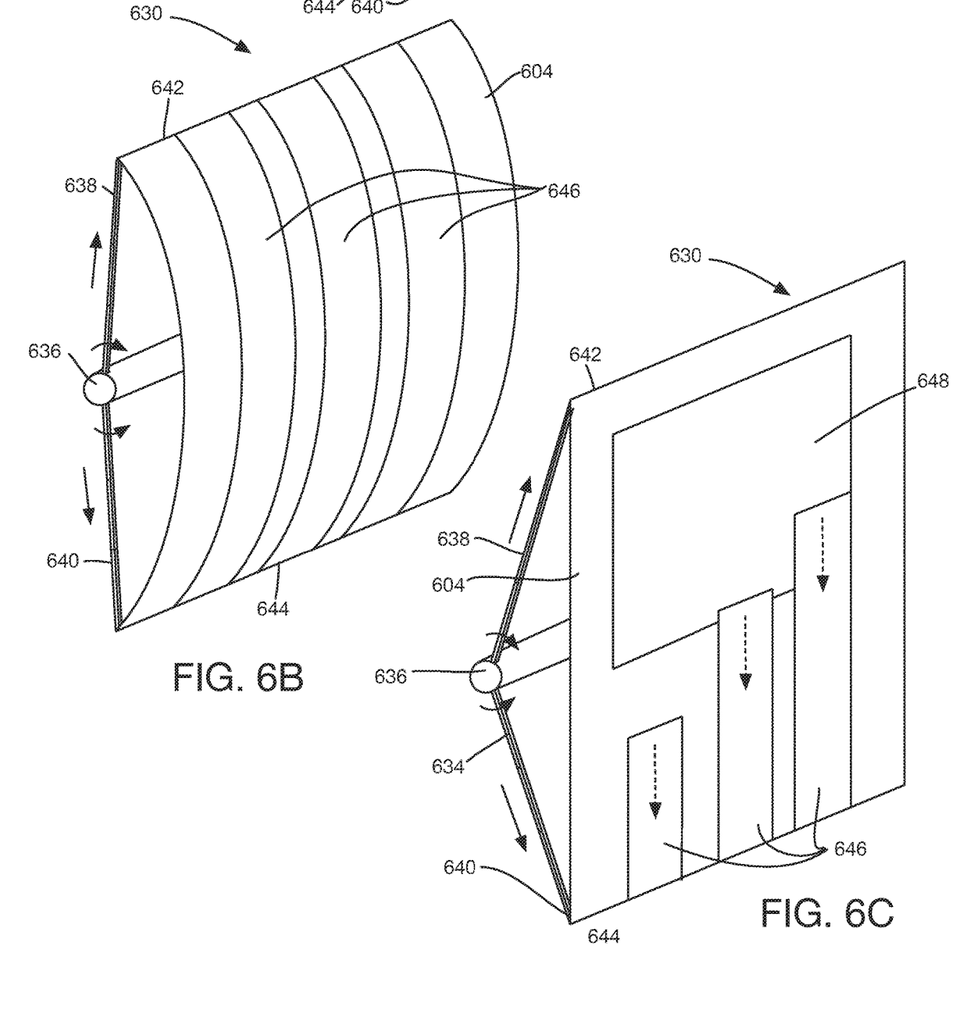

In this regard, FIGS. 6A-6C illustrate a flexible display mechanism 630 for reversibly deforming a configurable flexible display 604 between a first cylindrical shape 632 and a second flat shape 634, according to some embodiments. Referring now to FIG. 6A, the flexible display is reversibly deformed into a cylindrical shape 632 about a motorized hinge mechanism 636, with one or more first extendible arms 638 and one or more second extendible arms 640 coupling a respective first end 642 and second end 644 of the flexible display 604 to the motorized hinge mechanism 636. In the configuration of FIG. 6A, the first extendible arm 638 and second extendible arm 640 are retracted and rotated about the motorized hinge mechanism 636 to reversibly deform the flexible display 604 into the cylindrical shape 632, so that a portion of the flexible display 604 is visible to the user and another portion of the flexible display 604 is not visible to the user. In some embodiments, the flexible display 604 may display virtual slot reels 646 having a plurality of symbols, which may be animated to simulate spinning physical slot reels during play of a primary slot game, for example.

In some embodiments, a game event such as a bonus game trigger event, may cause the flexible display mechanism 630 to reversibly deform the flexible display from the cylindrical shape 632 to a flat shape 634 for displaying the bonus game. The motorized hinge mechanism 636 rotates each of the first extendible arm 638 and second extendible arm 640 away from the other, with each rotating from a first rotational position to a second rotational position. As shown by FIG. 6B, as the first extendible arm 638 and second extendible arm 640 rotate away from each other, each the first extendible arm 638 and second extendible arm 640 extends from a retracted arm configuration having a first length to an extended arm configuration having a second length larger than the first length to move the respective first end 642 and second end 644 of the flexible display away from the motorized hinge mechanism 636. As shown by FIG. 6C, when the first extendible arm 638 and second extendible arm 640 are fully rotated and extended to reversibly deform the flexible display 604 into a flat shape for displaying the bonus game. In this example, the virtual slot reels 646 are animated to appear as if they are dropping off of the flexible display to reveal bonus game elements 648 for the bonus game on the flexible display 604. In this example, at the conclusion of the bonus game, the process is reversed, and the flexible display mechanism 630 retracts and rotates the first extendible arm 638 and second extendible arm 640 back to their original positions to reversibly deform the flexible display 604 from the flat shape 634 of FIG. 6C to the cylindrical shape 632 of FIG. 6A, at which point the primary slot game resumes.

In another example, a primary game may have a flat configuration, similar to the configuration of FIG. 6C, with the flexible screen being deformed into a cylindrical shape similar to the configuration of FIG. 6A in response to triggering a wheel of fortune style bonus game. The player can touch the screen and drag a virtual wheel to spin the wheel. When the user releases their finger, the virtual wheel will rotate and slow down, revealing the prize for the user. Once the bonus is finished, the reel will flatten back out.

Figure 6D:
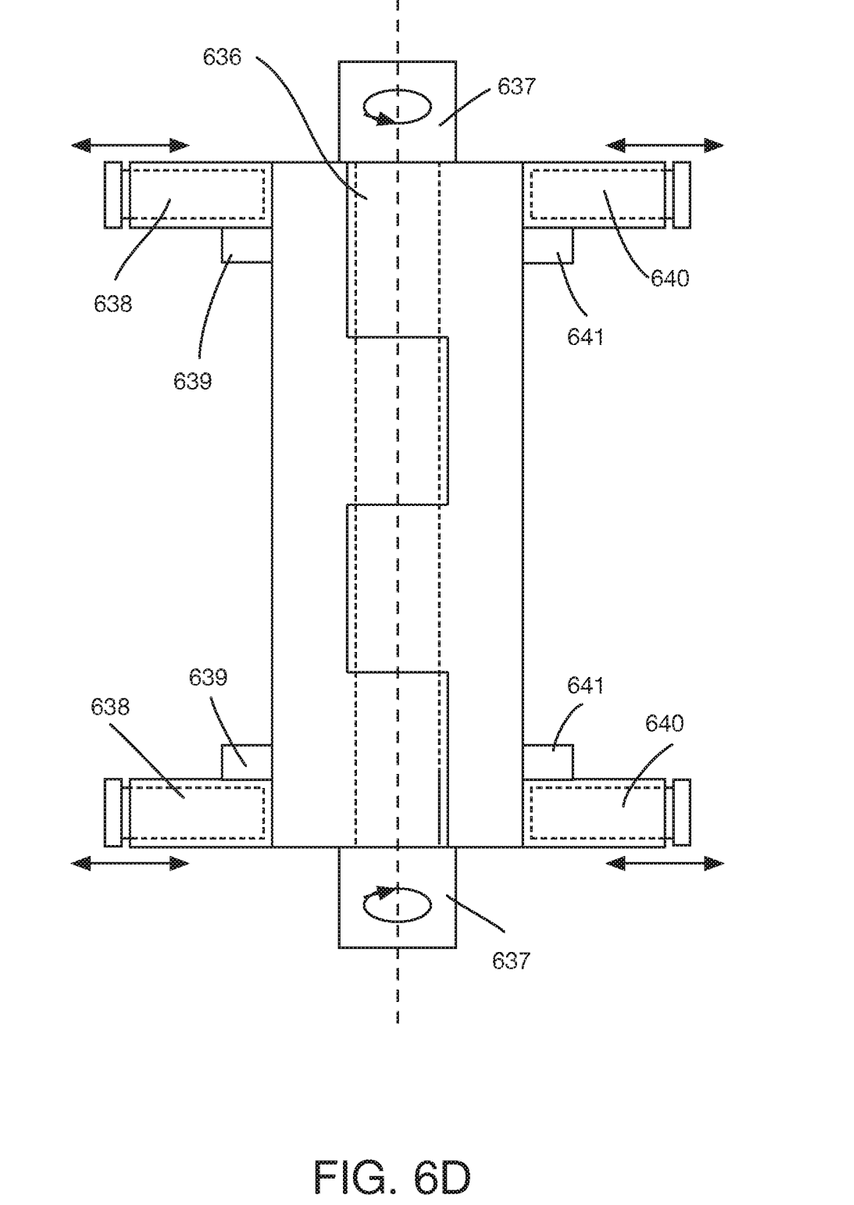
FIG. 6D illustrates a detailed view of the rotatable hinge mechanism of FIGS. 6A-6C, according to some embodiments.

FIG. 6D illustrates a detailed view of the hinge mechanism 636 of FIGS. 6A-6C, according to some embodiments. The hinge mechanism 636 in this embodiment includes a pair of rotational actuator motors 637 at opposite ends of the hinge mechanism 636 for rotating the hinge mechanism 636. A pair of first extendible arms 638 are disposed at opposite ends of the hinge mechanism 636 with a linear actuator motor 639 controlling linear actuation of each respective first extendible arm 638. Likewise, a pair of second extendible arms 640 are also disposed at opposite ends of the hinge mechanism 636 with a linear actuator motor 641 controlling linear actuation of each respective first extendible arm 640. It should be understood that FIGS. 6A-6D and other figures are illustrated to show details of the elements therein and are not necessarily illustrated to scale.

Figure 7:
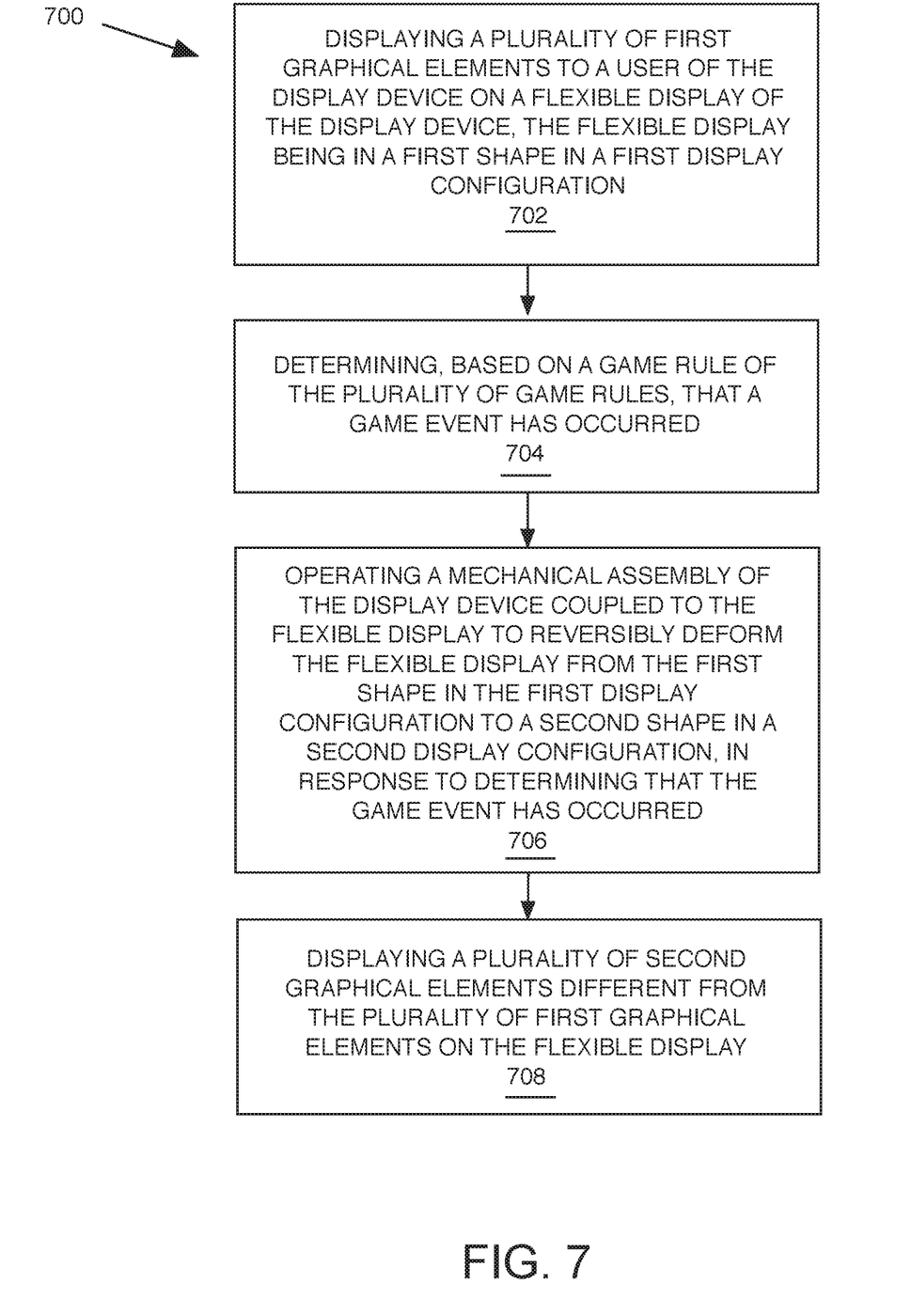
FIG. 7 is a flowchart diagram of a method of operating an EGM having a configurable flexible display, according to an embodiment.

Referring now to FIG. 7, a flowchart of a method 700 of operating a display device, such as the EGMs described above, is disclosed. The method 700 includes displaying a plurality of first graphical elements to a user of the display device on a flexible display of the display device, the flexible display being in a first shape in a first display configuration (Block 702). The method 700 further includes determining, based on a game rule of the plurality of game rules, that a game event has occurred (Block 704). The method 700 further includes operating a mechanical assembly of the display device coupled to the flexible display to reversibly deform the flexible display from the first shape in the first display configuration to a second shape in a second display configuration, in response to determining that the game event has occurred (Block 706). The method 700 further includes displaying a plurality of second graphical elements different from the plurality of first graphical elements on the flexible display (Block 708). It should be understood, however, that other methods having a greater number of steps, a smaller number of steps, and/or different steps, are also contemplated.

Figure 8:
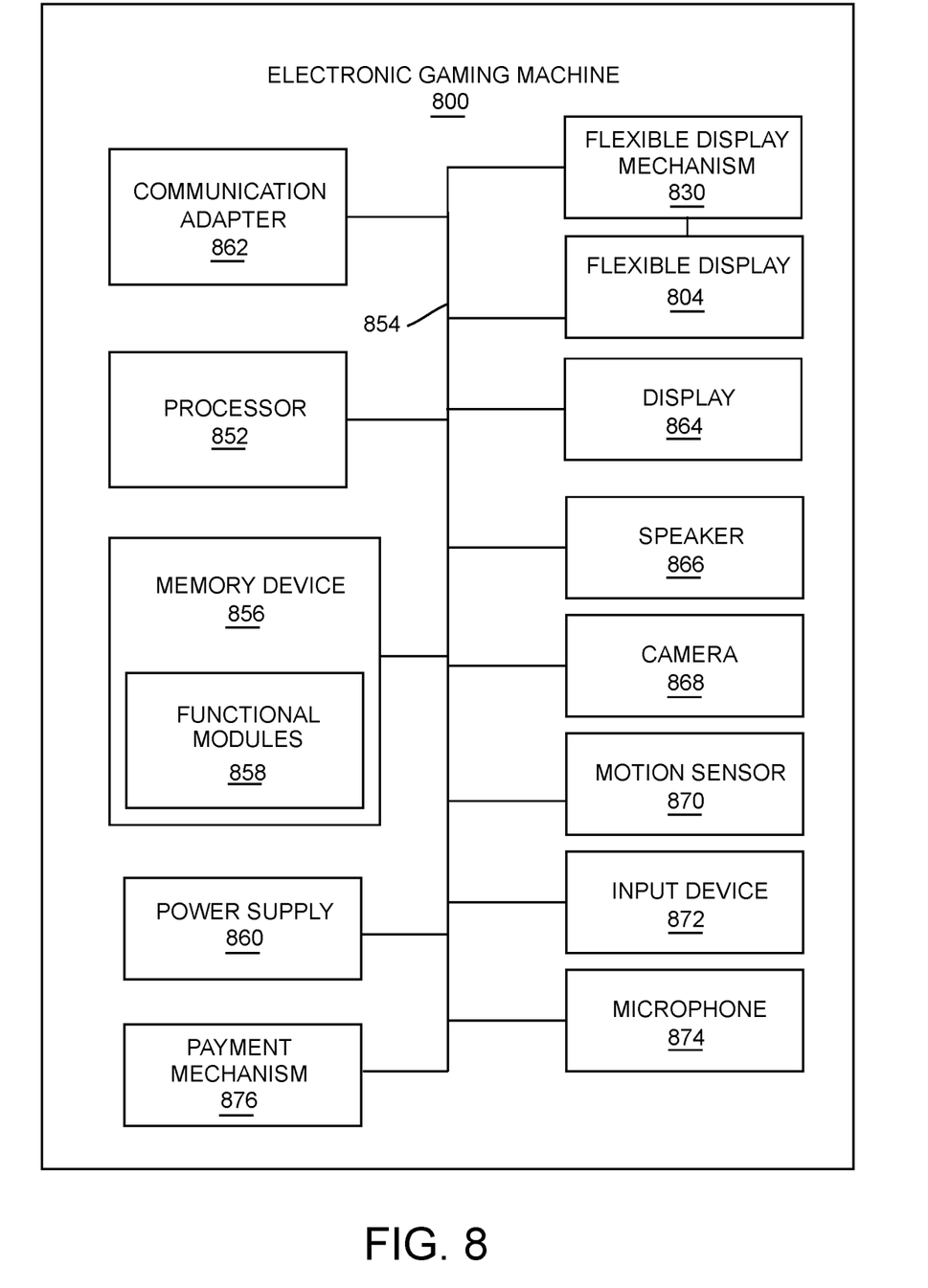
FIG. 8 is a block diagram that illustrates various components of an EGM according to some embodiments.

As discussed above, some embodiments include a configurable flexible display as part of an EGM having a number of additional components for interacting with the configurable flexible display. In this regard, reference is now made to FIG. 8, which is a block diagram that illustrates various components of an EGM 800, which may embody or include aspects of the features discussed above, according to some embodiments. As shown in FIG. 8, the EGM 800 may include a processor 852 that controls operations of the EGM 800. Although illustrated as a single processor, multiple special purpose and/or general-purpose processors and/or processor cores may be provided in the EGM 800. For example, the EGM 800 may include one or more of a video processor, a signal processor, a sound processor and/or a communication controller that performs one or more control functions within the EGM 800. The processor 852 may be variously referred to as a "controller," "microcontroller," "microprocessor" or simply a "computer." The processor 852 may further include one or more application-specific integrated circuits (ASICs).

In some embodiments, the processor may be connected to a flexible display mechanism 830, operable to reversibly deform a flexible display 804 and perform other functions in response to receiving instructions from the processor 852.

Various additional components of the EGM 800 are also illustrated in FIG. 8 as being connected to the processor 852. It will be appreciated that the components may be connected to the processor 852 and/or each other through one or more busses 854 including a system bus, a communication bus and controller, such as a USB controller and USB bus, a network interface, or any other suitable type of connection.

The EGM 800 further includes a memory device 856 that stores one or more functional modules 858 for performing the operations described above. Alternatively, or in addition, some of the operations described above may be performed by other devices connected to a network, for example. The EGM 800 may communicate with other devices connected to the network to facilitate performance of some of these operations. For example, the EGM 800 may communicate and coordinate with certain EGMs to identify players at a particular EGM.

The memory device 856 may store program code and instructions, executable by the processor 852, to control the EGM 800. The memory device 856 may include random access memory (RAM), which can include non-volatile RAM (NVRAM), magnetic RAM (MRAM), ferroelectric RAM (FeRAM) and other forms as commonly understood in the gaming industry. In some embodiments, the memory device 878 may include read only memory (ROM). In some embodiments, the memory device 856 may include flash memory and/or EEPROM (electrically erasable programmable read only memory). Any other suitable magnetic, optical and/or semiconductor memory may operate in conjunction with the display device disclosed herein.

The EGM 800 may include a power supply 860 that provides power to EGM 800 and its components. The power supply 860 may be a conventional power supply that may be plugged into an AC or DC electrical socket, or may be hard-wired into an electrical power system or grid, such as a building power supply. The power supply 860 may also include a battery that provides power to the EGM 800 and/or certain components in the event that the EGM is disconnected from an AC or DC power source, for example.

The EGM 800 may include a communication adapter 862 that enables the EGM 800 to communicate with remote devices, such as the wireless network, another EGM 800, and/or a wireless access point, over a wired and/or wireless communication network, such as a local area network (LAN), wide area network (WAN), cellular communication network, or other data communication network.

The EGM 800 may include one or more internal or external communication ports that enable the processor 852 to communicate with and to operate with internal or external peripheral devices and/or interface elements, such as the flexible display 804, additional displays 864, speakers 866, cameras 868, sensors, such as motion sensors 870, input devices 872, such as buttons, switches, keyboards, pointer devices, and/or keypads, mass storage devices, microphones 874, payment mechanisms 876 such as bill and/or coin acceptors/dispensers, credit/debit card readers, Bluetooth and/or near-field communication (NFC) interfaces or other interfaces for receiving and/or dispensing currency and/or credit, and wireless communication devices.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented by hardware (including as stand-alone printed circuit boards (PCBs), induction coils, RGB LEDs, etc.), by software (including firmware, resident software, microcode, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A display device comprising:
   a processor circuit;
   a memory coupled to the processor circuit;
   a flexible display coupled to the processor circuit to display graphical elements to a user in response to instructions from the processor circuit, the flexible display being reversibly deformable between a first display configuration and a second display configuration; and
   a mechanical assembly coupled to the flexible display to reversibly deform the flexible display between the first display configuration and the second display configuration,
   wherein a first portion of the flexible display forms a convex cylindrical arc comprising a central angle of at greater than 180 degrees in the first display configuration, wherein a second portion of the first portion of the flexible display is not visible to the user at any viewing angle in the first display configuration, and wherein the first portion of the flexible display is not convex with respect to the user in the second display configuration, wherein the entire flexible display is visible to the user in the second display configuration.

2. The display device of claim 1, wherein the mechanical assembly further comprises:
an arm movable between a first arm configuration and a second arm configuration, wherein moving the arm from the first arm configuration to the second arm configuration causes the flexible display to deform from the first display configuration to the second display configuration,
wherein moving the arm from the second arm configuration to the first arm configuration causes the flexible display to deform from the second display configuration to the first display configuration.

3. The display device of claim 2, wherein the arm is rotatable between a first rotational position and a second rotational position, wherein moving the arm from the first arm configuration to the second arm configuration comprises rotating the arm from the first rotational position to the second rotational position.

4. The display device of claim 3, wherein the arm is extendible between a first length and a second length, wherein moving the arm from the first arm configuration to the second arm configuration comprises extending the arm from the first length to the second length.

5. The display device of claim 2, wherein the arm is extendible between a first length and a second length, wherein moving the arm from the first arm configuration to the second arm configuration comprises extending the arm from the first length to the second length.

6. The display device of claim 1, wherein the first portion of the flexible display is concave with respect to the user in the second display configuration.

7. The display device of claim 1, wherein the flexible display is a flexible organic light-emitting diode (OLED) display.

8. The display device of claim 7, wherein the flexible display is a flexible polymer-OLED (pLED) display.

9. The display device of claim 1, wherein a second portion of the flexible display that is above the first portion is not convex with respect to the user in the first display configuration.

10. The display device of claim 9, wherein a third portion of the flexible display that is below the first portion is not convex with respect to the user in the first display configuration.

11. The display device of claim 10, wherein the second portion and the third portion of the flexible display are not convex with respect to the user in the second display configuration.

12. A method of operating a display device comprising:
displaying a plurality of first graphical elements to a user on a flexible display of the display device, the flexible display being in a first display configuration, wherein a first portion of the flexible display forms a convex cylindrical arc comprising a central angle of at least 30 degrees in the first display configuration;
operating a mechanical assembly of the display device coupled to the flexible display to reversibly deform the flexible display from the first display configuration to a second display configuration, wherein the first portion of the flexible display is not convex with respect to the user in the second display configuration, and wherein operating the mechanical assembly further comprises moving a convex support structure of the mechanical assembly between an extended position and a retracted position to reversibly deform the flexible display; and
displaying a plurality of second graphical elements to the user on the flexible display in the second display configuration.

13. The method of claim 12, wherein the plurality of first graphical elements are part of a slot game comprising a plurality of game rules being played by the user of the display device, and
wherein displaying the plurality of first graphical elements comprises displaying a plurality of graphical slot reels of the slot game on the first portion of the flexible display that forms the convex cylindrical arc, the method further comprising:
determining, based on a game rule of the plurality of game rules, that a game event has occurred, wherein operating the mechanical assembly comprises operating the mechanical assembly to reversibly deform the flexible display in response to determining that the game event has occurred.

14. The method of claim 13, wherein the plurality of second graphical elements are part of a bonus game, and
wherein displaying the plurality of second graphical elements comprises displaying a plurality of bonus game symbols of the bonus game.

15. The method of claim 12, wherein a second portion of the flexible display is fixed above the first portion of the flexible display in a fixed configuration that is not convex with respect to the user.

16. The method of claim 15, wherein a third portion of the flexible display is fixed below the first portion of the flexible display in a fixed configuration that is not convex with respect to the user.

17. A flexible display assembly for a display device comprising:
a flexible display to display graphical elements to a user, the flexible display being reversibly deformable between a first display configuration and a second display configuration; and
a mechanical assembly coupled to the flexible display to reversibly deform the flexible display between the first display configuration and the second display configuration,
wherein a first portion of the flexible display forms a convex cylindrical arc comprising a central angle of at least 90 degrees in the first display configuration,
wherein the first portion of the flexible display is not convex with respect to the user in the second display configuration,
wherein a second portion of the flexible display that is above the first portion is not convex with respect to the user in the first display configuration,
wherein a third portion of the flexible display that is below the first portion is not convex with respect to the user in the first display configuration, and
wherein the second portion and the third portion of the flexible display are not convex with respect to the user in the second display configuration.

* * * * *